(12) United States Patent
Eaton

(10) Patent No.: US 7,500,034 B2
(45) Date of Patent: Mar. 3, 2009

(54) MULTIPLE INTEGRATED CIRCUIT CONTROL

(75) Inventor: Bill Eaton, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 10/732,722

(22) Filed: Dec. 10, 2003

(65) Prior Publication Data

US 2005/0132213 A1 Jun. 16, 2005

(51) Int. Cl.
*G06F 13/42* (2006.01)
*G06F 13/36* (2006.01)

(52) U.S. Cl. .................. 710/106; 710/113; 714/731; 358/1.9

(58) Field of Classification Search .................. 710/106, 710/110; 714/800–802; 708/531
See application file for complete search history.

(56) References Cited

U.S. PATENT DOCUMENTS

| | | | |
|---|---|---|---|
| 4,387,397 A | | 6/1983 | Dietz |
| 4,426,637 A | | 1/1984 | Apple et al. |
| 4,805,137 A | | 2/1989 | Grant et al. |
| 4,935,734 A | | 6/1990 | Austin |
| 5,500,861 A | * | 3/1996 | Oppedahl ..................... 714/731 |
| 5,703,759 A | | 12/1997 | Trimberger |
| 5,721,703 A | | 2/1998 | Habersetzer et al. |
| 5,929,655 A | | 7/1999 | Roe et al. |
| 6,092,138 A | * | 7/2000 | Schutte ....................... 710/113 |
| 6,449,289 B1 | * | 9/2002 | Quicksall ..................... 370/475 |
| 6,535,519 B1 | | 3/2003 | Ghodrat |
| 6,757,857 B2 | * | 6/2004 | Lamb et al. ................... 714/740 |
| 6,924,903 B2 | * | 8/2005 | Brooks et al. ................ 358/1.15 |
| 6,967,744 B1 | * | 11/2005 | Kawamoto ................... 358/1.9 |
| 6,968,472 B2 | * | 11/2005 | Fernald ....................... 713/400 |
| 7,089,338 B1 | * | 8/2006 | Wooten et al. ............... 710/110 |
| 7,106,103 B2 | * | 9/2006 | Smith et al. .................. 326/82 |
| 7,136,076 B2 | * | 11/2006 | Evanicky et al. ............. 345/600 |
| 7,168,006 B2 | * | 1/2007 | Baker et al. .................. 714/34 |

OTHER PUBLICATIONS

Single-ended signaling—retrieved Apr. 13, 2007—from http://en.wikipedia.org/wiki/Single-ended_signalling—1 page.*
Differential signaling—retrieved Apr. 13, 2007—from http://en.wikipedia.org/wiki/Differential_signalling—3 pages.*
Low voltage differential signaling—retrieved Apr. 13, 2007—from http://en.wikipedia.org/wiki/Low_voltage_differential_signaling—3 pages.*
Lattice Semiconductor Corporation—"Differential Signaling"—May 2001—4 pages.*
Philips Semiconductors, The I²C-Bus Specification, Version 2.1, Jan. 2000, pp. 1-46.

* cited by examiner

*Primary Examiner*—Paul R Myers
*Assistant Examiner*—Brian T Misiura

(57) ABSTRACT

In an implementation of multiple integrated circuit control, a multiple integrated circuit controller initiates and controls data transactions between the multiple integrated circuit controller and integrated circuits. A data link communicates the data transactions between the multiple integrated circuit controller and the integrated circuits, and a clock signal link communicates a clock signal generated by the multiple integrated circuit controller to the integrated circuits. The multiple integrated circuit controller includes a first push-pull driver to drive the data transactions on the data link and includes a second push-pull driver to drive the clock signal on the clock signal link.

38 Claims, 7 Drawing Sheets

MULTIPLE INTEGRATED CIRCUIT CONTROL

BACKGROUND

A bus is a network topology or communication circuit by which devices and/or components attached to the bus send and receive data. In an electronic or imaging device, for example, components of the device that are attached to the bus each have a unique address, or identity, by which a particular component can recognize data and/or a communication intended for the component. Imaging devices, such as printing devices and all-in-one devices that scan, print, and copy, have motors, motor drivers, power supplies, memory devices, and any one or more other similar components that are interfaced within a device by an integrated circuit. The integrated circuits interface the components for signal and data communications via a bus network within a device.

BRIEF DESCRIPTION OF THE DRAWINGS

The same numbers are used throughout the drawings to reference like features and components.

DETAILED DESCRIPTION

Multiple integrated circuit control can be implemented as an interface to control multiple integrated circuits, and in an embodiment, is implemented with only a data signal and a clock signal. In an implementation, a multiple integrated circuit controller initiates and controls clock timing and data transactions between the multiple integrated circuit controller and integrated circuits. A data link communicates the data transactions between the multiple integrated circuit controller and the integrated circuits, and a clock signal link communicates a clock signal generated by the multiple integrated circuit controller to the integrated circuits.

Multiple integrated circuit control provides a simple, low-cost interface between multiple integrated circuits to initiate and control data transactions, circuit functions, and component operation. In an embodiment, a multiple integrated circuit controller is coupled to multiple integrated circuits, such as component interface circuits in an electronic device. The data transactions are communicated via shared data signal connections between the multiple integrated circuit controller and the integrated circuits.

Figure 1:
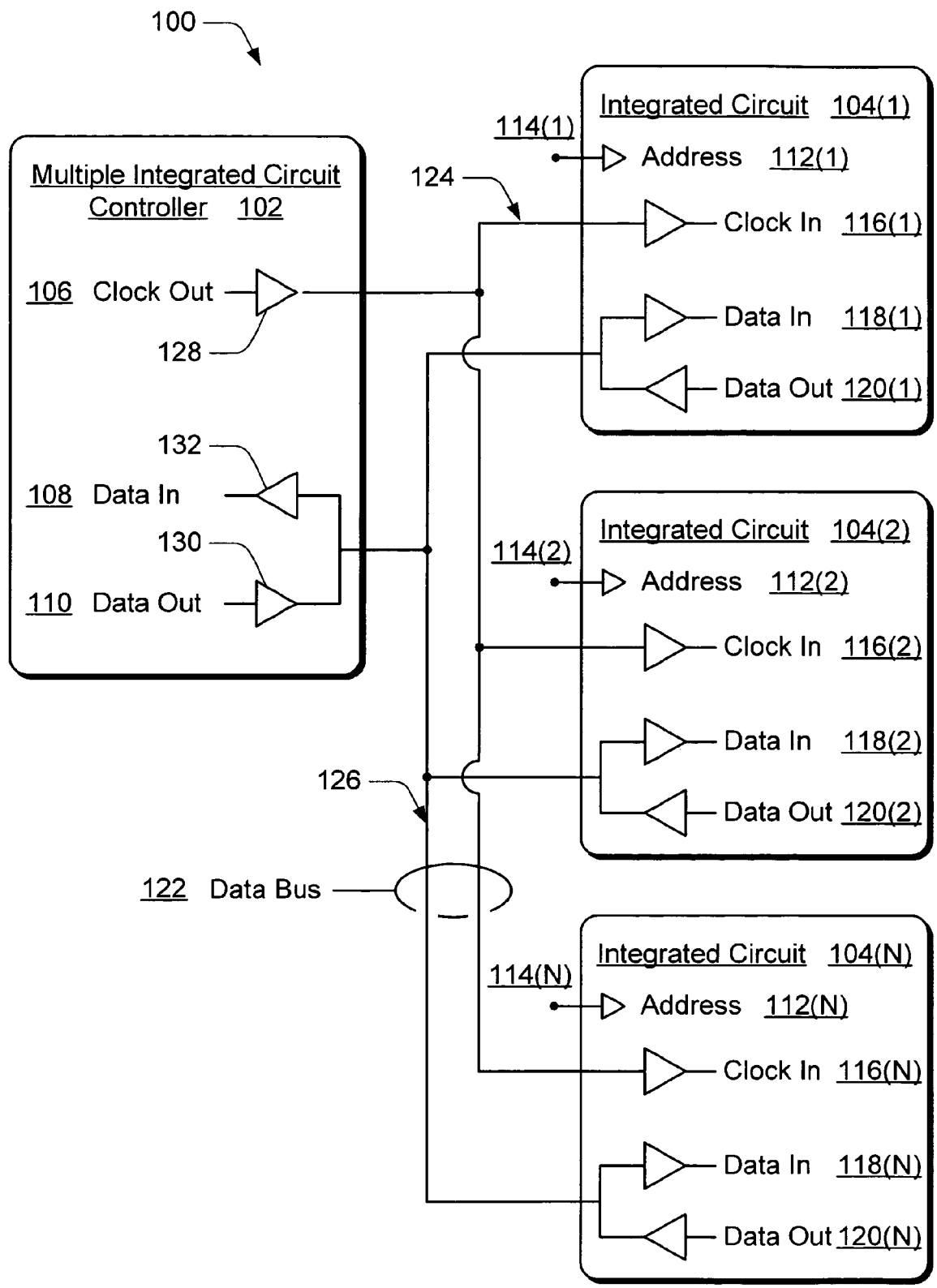
FIG. 1 illustrates an embodiment of a multiple integrated circuit control in a single-ended interface circuit.

FIG. 1 illustrates an example of a single-ended interface circuit 100 in which an embodiment of multiple integrated circuit control can be implemented. A multiple integrated circuit controller 102 is implemented to control any number of integrated circuits 104(1-N). The integrated circuits can be any number of component interface circuits, such as in an electronic or imaging device. For example, an integrated circuit 104 may be implemented to interface any one or more of motors, motor drivers, power supplies, supervisory circuits, analog to digital converters, general purpose input/outputs, dedicated circuits, memory devices, and any other similar components and devices in an electronic or imaging device. An example of an imaging device is described below with reference to an embodiment of a printing device 700 shown in FIG. 7. Printing device 700 includes examples of components and devices that may have an integrated circuit interface which can be controllably coupled to the multiple integrated circuit controller 102.

The multiple integrated circuit controller 102 includes a clock signal output 106, a data input 108, and a data output 110. Each of the integrated circuits 104(1-N) include a unique address 112(1-N), respectively, that is a static input 114(1-N) to define each integrated circuit. Additionally, each of the integrated circuits 104(1-N) include a clock input 116, a data input 118, and a data output 120. A data input 118 and a data output 120 for an integrated circuit 104 share a common data channel.

A data bus 122 links the multiple integrated circuit controller 102 to each of the integrated circuits 104(1-N). In an implementation, the data bus 122 is a two-wire control data bus that includes a clock signal link 124 and a data link 126. The clock output 106 of the multiple integrated circuit controller 102 is coupled to each clock input 116(1-N) of the integrated circuits 104(1-N) via the clock signal link 124. In this embodiment, the data link 126 operates as a two-way data communication link (e.g., is bi-directional). The data input 108 of the multiple integrated circuit controller 102 is coupled to each data output 120 of the integrated circuits 104(1-N) via the data link 126, and the data output 110 of the multiple integrated circuit controller 102 is coupled to each data input 118(1-N) of the integrated circuits 104(1-N) also via the data link 126. Timing of the system 100 is controlled to enable one data transaction at any one time to reduce the likelihood of overlapping or interfering data transactions.

The clock signal (e.g., clock output 106) is generated and timing of the system 100 is controlled by the multiple integrated circuit controller 102. The multiple integrated circuit controller 102 includes a push-pull driver 128 to drive the clock signal 106 on the clock signal link 124. Additionally, data transactions are initiated and controlled by the multiple integrated circuit controller 102 and the integrated circuits 104(1-N) respond to commands from the multiple integrated circuit controller 102. The multiple integrated circuit controller 102 also includes a push-pull driver 130 to drive a data transaction on the data link 126, and includes a data receiver 132 to receive a data transaction from the data link 126.

For a write data transaction to a first integrated circuit 104(1), the multiple integrated circuit controller 102 initiates a communication of write data from the multiple integrated circuit controller 102 to the integrated circuit 104(1) via the data link 126. Additionally, for a read data transaction from a second integrated circuit 104(2), the multiple integrated circuit controller 102 initiates a communication of read data from the integrated circuit 104(2) to the multiple integrated circuit controller 102 via the data link 126. The multiple integrated circuit controller 102 initiates and controls the write data transaction and the read data transaction via the two-way data link 126.

Figure 2:
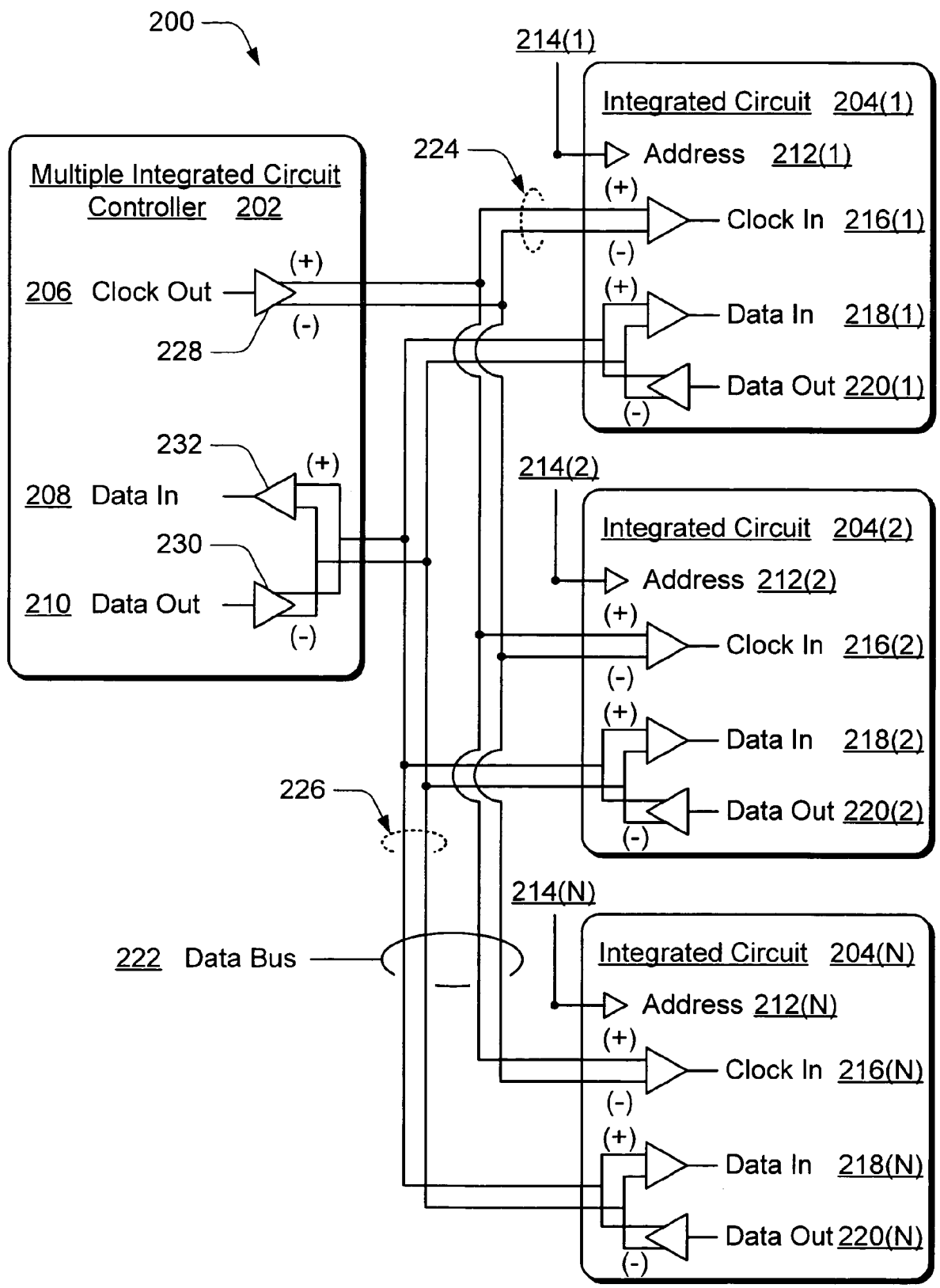
FIG. 2 illustrates an embodiment of a multiple integrated circuit control in an embodiment of a low voltage differential signaling interface circuit.

FIG. 2 illustrates an example of a low voltage differential signaling interface circuit 200 in which an embodiment of multiple integrated circuit control can be implemented. A multiple integrated circuit controller 202 is implemented to control any number of integrated circuits 204(1-N). The integrated circuits can be any number of component interface circuits, such as in an electronic or imaging device as described above with reference to FIG. 1.

The multiple integrated circuit controller 202 includes a clock signal output 206, a data input 208, and a data output 210. Each of the integrated circuits 204(1-N) include a unique address 212(1-N), respectively, that is a static input 214(1-N) to define each integrated circuit. Additionally, each of the integrated circuits 204(1-N) include a clock input 216, a data input 218, and a data output 220.

A data bus 222 links the multiple integrated circuit controller 202 to each of the integrated circuits 204(1-N). In an implementation, the data bus 122 includes a differential clock signal link 224 and a differential data link 226. The clock output 206 of the multiple integrated circuit controller 202 is coupled to each clock input 216(1-N) of the integrated circuits 204(1-N) via the differential clock signal link 224. In this embodiment, the differential data link 226 operates as a two-way data communication link. The data input 208 of the multiple integrated circuit controller 202 is coupled to each data output 220(1-N) of the integrated circuits 204(1-N) via the differential data link 226. Further, the data output 210 of the multiple integrated circuit controller 202 is coupled to each data input 218(1-N) of the integrated circuits 204(1-N) also via the differential data link 226.

The clock signal (e.g., clock output 206) is generated and timing of the system 200 is controlled by the multiple integrated circuit controller 202 to enable one data transaction at any one time to reduce the likelihood of overlapping or interfering data transactions. The multiple integrated circuit controller 202 includes a differential driver 228 to drive the clock signal 206 on the differential clock signal link 224. In this embodiment, the differential clock signal link communicates the clock signal as a low-voltage differential clock signal from the multiple integrated circuit controller 202 to the integrated circuits 204(1-N). Additionally, data transactions are initiated and controlled by the multiple integrated circuit controller 202 and the integrated circuits 204(1-N) respond to commands from the multiple integrated circuit controller 202. The multiple integrated circuit controller 202 also includes a differential driver 230 to drive a data transaction on the differential data link 226, and includes a differential data receiver 232 to receive a data transaction from the shared differential data link 226.

In this embodiment, the differential data link 226 communicates data between the multiple integrated circuit controller 202 and the integrated circuits 204(1-N) as low-voltage differential data signal(s). For example, for a write data transaction to a first integrated circuit 204(1), the multiple integrated circuit controller 202 initiates a communication of write data from the multiple integrated circuit controller 202 to the integrated circuit 204(1) via the differential data link 126. Additionally, for a read data transaction from a second integrated circuit 204(2), the multiple integrated circuit controller 202 initiates a communication of read data from the integrated circuit 204(2) to the multiple integrated circuit controller 202 via the differential data link 226.

Figure 3:
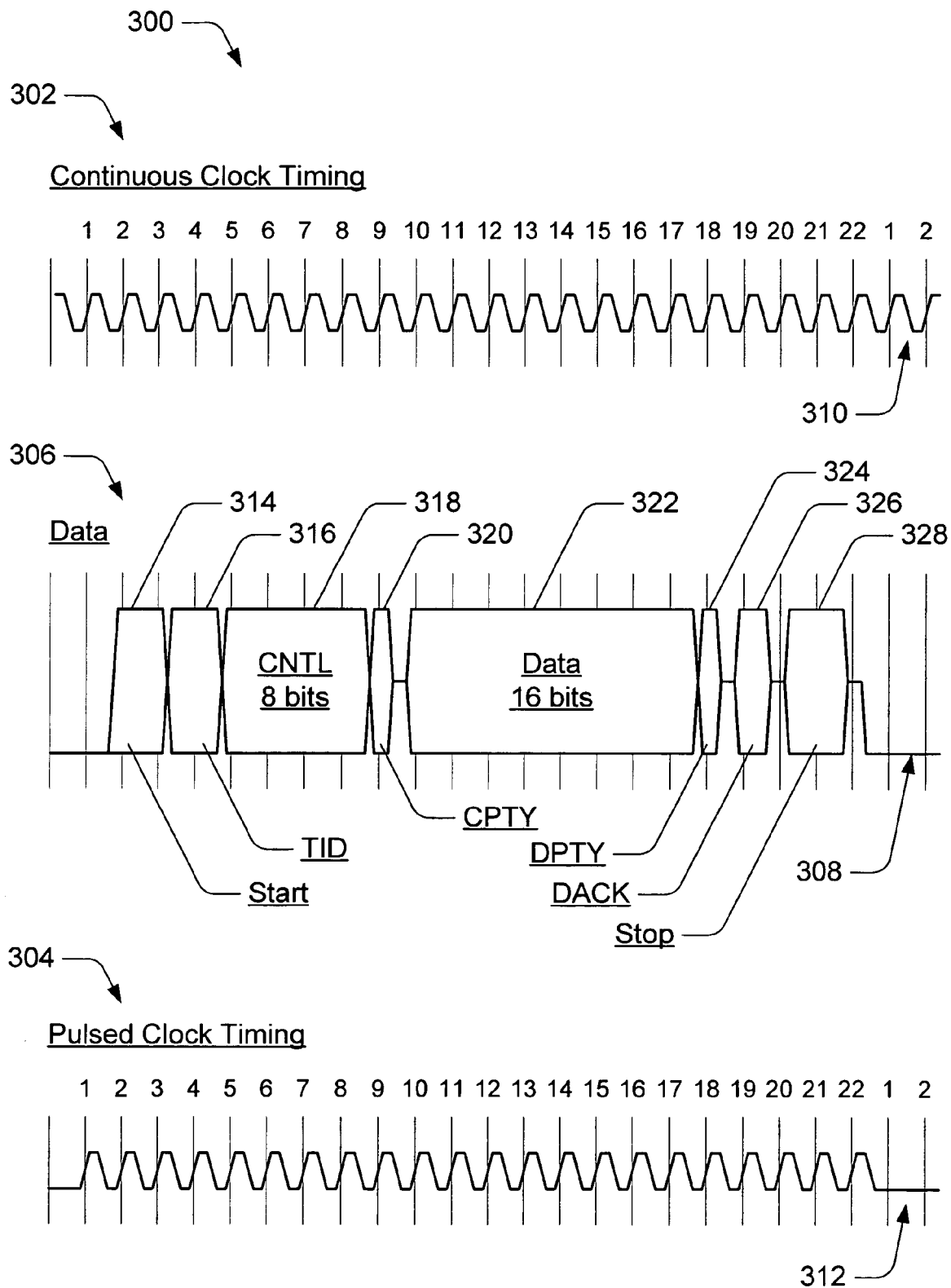
FIG. 3 illustrates an embodiment of timing diagrams for continuous clock timing and pulsed clock timing for data communication with an embodiment of multiple integrated circuit control.

FIG. 3 illustrates an embodiment of timing diagrams 300 for continuous clock timing 302 and pulsed clock timing 304 when data 306 is communicated between a multiple integrated circuit controller and an integrated circuit (e.g., between multiple integrated circuit controller 202 and an integrated circuit 204 via data link 226 as shown in FIG. 2). The following description and examples reference the exemplary components of the low voltage differential signaling interface circuit 200 shown in FIG. 2 for illustration only and is not so limited. The following description and examples may also be described with reference to the single-ended interface circuit 100 shown in FIG. 1.

A clock signal, such as from clock output 206 of multiple integrated circuit controller 202 to clock inputs 216(1-N) of each of the integrated circuits 204(1-N), can be generated by the multiple integrated circuit controller 202 as a continuous clock signal 302 or can be generated as a pulsed clock signal 304. After a data communication (e.g., a data bit transfer), indicated at 308 and after clock cycle twenty-two (22), the continuous clock signal 302 continues to cycle at 310 while the pulsed clock signal 304 goes idle (e.g., low for single ended system 100 or zero ("0") for differential system 200) at 312. The pulsed clock 304 can be implemented to reduce electromagnetic interference generated by the clock signal.

In an embodiment, a data transaction is communicated during twenty-two (22) clock cycles as shown for the continuous clock timing 302 and the pulsed clock timing 304. A data communication 306 includes several components of data bits and, in this example, includes:

Start indication 314 is three (3) bits which initiates on a rising edge of the clock signal (e.g., continuous clock signal 302 or pulsed clock signal 304);

TID (target identifier) 316 is three (3) bits which identifies a particular integrated circuit (e.g., a target device);

CNTL (control) 318 is eight (8) bits which indicates or identifies a unique action, process, or data transaction (e.g., read, write, etc.) for the identified integrated circuit (e.g., the target device);

CPTY (control parity) 320 is one (1) bit plus one (1) bit for bus turnaround and is an odd parity value corresponding to the target identifier (TID) 316 and the control (CNTL) 318 values;

Data 322 is communicated as sixteen (16) bits from the sending device to the receiving device (e.g., to the target device);

DPTY (data parity) 324 is one (1) bit plus (1) bit for bus turnaround and is an odd parity value corresponding to the data 322 and which is communicated by the sending device to the receiving device;

DACK (data acknowledgment) 326 is two (2) bits plus one (1) bit for bus turnaround. The receiving device communicates the data acknowledgement to the sending device to indicate a successful reception of the data 322 and the data parity (DPTY) 324 values;

Stop indication 328 is three (3) bits which indicates a data transaction completion and is a communication from the sending device to the receiving device to acknowledge reception of a valid data acknowledgement (DACK) 326; and IDLE (e.g., 308) is three (3) bits plus one (1) bit for bus turnaround and is the idle time on the bus before another data transaction is initiated. The multiple integrated circuit controller 202 drives a zero bit on the data bus 222 during the idle 308.

The data bits (e.g., of data communication 306) are transferred on each edge of a clock signal (e.g., clock signals 302 and 304) so that operating frequencies are reduced and to enable efficient use of available bandwidth. This protocol enables controlling the multiple integrated circuits 204(1-N) with only one clock signal and one data signal. The protocol also enables the data error checking and recovery from a corrupted data transaction.

Each of the integrated circuits 204(1-N) monitor a respective data input 218 and clock input 216. When an integrated circuit 204 detects a start indication 314, it next receives the target identifier (TID) 316 which is compared to the respective integrated circuit device identifier (e.g., address 212). A start indication 314 is driven by the multiple integrated circuit controller 202. An integrated circuit 204 identified by the target identifier (TID) 316 is the target device with which the multiple integrated circuit controller 202 has initiated a data transaction.

The target identifier (TID) 316 is three (3) bits in this described embodiment which allows eight (8) unique addresses that integrated circuits 204 can utilize. However, multiple integrated circuit control is not so limited. The target identifier (TID) 316 can be implemented with any number of data bits to allow addressing any number of integrated circuits (e.g., 204(1) to 204(N)).

The control component (CNTL) 318 defines an operation for the target device (e.g., the identified integrated circuit 204) and includes a read/write bit to indicate which device is the sending device and which is the receiving device for a data transaction. In an embodiment, an integrated circuit 204 determines an operation according to the control component (CNTL) 318 from a value that is maintained, such as with a memory component. The control parity (CPTY) 320 is communicated by the multiple integrated circuit controller 202 to the target device (e.g., the identified integrated circuit 204), and the data parity (DPTY) 324 is communicated by the sending device to the receiving device. In one embodiment, the control parity (CPTY) 320 and the data parity (DPTY) 324 are set such that the received value is odd (i.e., single bit odd parity). In another implementation, the error check can be implemented with a checksum, or with any number of other different error checking techniques.

For a write data transaction, the multiple integrated circuit controller 202 communicates data to a target or receiving device (e.g., an integrated circuit 204 identified by the target identifier (TID) 316). Thus, the multiple integrated circuit controller 204 is the sending device which communicates the data 322, the data parity (DPTY) 324, and the stop indication 328 to the receiving device. The receiving device communicates the data acknowledgement (DACK) 326 and then responds according to the data after receiving the valid stop indication 328.

In an implementation of a write data transaction, the multiple integrated circuit controller 202 drives the start indication 314, the target identifier (TID) 316, the control (CNTL) 318, and the control parity (CPTY) 320 values on the data link 226. The integrated circuits 204(1-N) detect the start indication 314 and decode the target identifier (TID) 316, control (CNTL) 318, and control parity (CPTY) 320 values. In an event that a received control parity (CPTY) 320 value matches the calculated value for the target identifier (TID) 316 and control (CNTL) 318 values, and the target identifier (TID) 316 value matches an integrated circuit "device ID", then the identified integrated circuit is the target or receiving device for the data transaction.

The multiple integrated circuit controller 202 waits for one (1) clock edge to begin communicating the data 322 and the data parity (DPTY) 324 values. The target device receives these values and checks the calculated data parity (DPTY) 324 value against the received data 322 and data parity (DPTY) 324 values. If these values match, the target device responds with a data acknowledgement (DACK) 326. If these values do not match, the target device aborts the data transaction. The multiple integrated circuit controller 202 detects the data acknowledgement (DACK) 326 response from the target device and if an invalid data acknowledgement (DACK) 326 response is detected, the multiple integrated circuit controller 202 aborts the data transaction.

If the multiple integrated circuit controller 202 detects a valid data acknowledgement (DACK) 326, however, then the controller 202 responds with a stop indication 328. The target device checks for the stop indication 328 and, if the stop indication 328 is not detected, then the target device aborts the data communication and discards the received control (CNTL) 318 and data 322 values. If a valid stop indication 328 is detected, the target device responds as required based on the contents of the control (CNTL) 318 and data 322 values. The multiple integrated circuit controller 202 then drives the data bus 222 idle (e.g., idle value 308) until the beginning of a next data transaction.

For a read data transaction, a target device (e.g., an integrated circuit 204 identified by the target identifier (TID) 316) communicates the data 322 to the multiple integrated circuit controller 202. Thus, the target device is the sending device that generates the data 322, data parity (DPTY) 324, and stop indication 328 values. The multiple integrated circuit controller 202 is the receiving device that generates the data acknowledgement (DACK) 326 value.

In an implementation of a read data transaction, the multiple integrated circuit controller 202 drives the start indication 314, the target identifier (TID) 316, the control (CNTL) 318, and the control parity (CPTY) 320 values on the data link 226. The integrated circuits 204(1-N) detect the start indication 314 and decode the target identifier (TID) 316, control (CNTL) 318, and control parity (CPTY) values. In an event that a received control parity (CPTY) 320 value matches the calculated value for the target identifier (TID) 316 and control (CNTL) 318 values, and the target identifier (TID) 316 value matches the target device "device ID", then the sending device is the target device for the data transaction.

The sending device (e.g., an integrated circuit 204 identified as the target device by the target identifier (TID) 316) waits for one (1) clock edge to begin communicating the data 322 and data parity (DPTY) 324 values. The receiving device (e.g., the multiple integrated circuit controller 202) receives these values and checks the calculated data parity (DPTY) 324 value against the received data 322 and data parity (DPTY) 324 values. If these values match, the receiving device responds with a data acknowledgement (DACK) 326. If these values do not match, the receiving device aborts the data transaction. The sending device detects the data acknowledgement (DACK) 326 response from the receiving device and if an invalid data acknowledgement (DACK) 326 response is detected, the sending device aborts the data transaction.

If the sending device detects a valid data acknowledgement (DACK) 326, however, then the sending device responds with a stop indication 328. The receiving device checks for the stop indication 328 and, if the stop indication 328 is not detected, the receiving device aborts the data transaction and discards the received data 322. If a valid stop indication 328 is detected, the receiving device loads the received data 322 and drives the data bus 222 idle (e.g., idle value 308) until the beginning of a next data transaction.

In an embodiment of multiple integrated circuit control, the error checking increases reliability for data communication via a data bus (e.g., data bus 122 or 222 shown in FIGS. 1 and 2). For a data transaction between a sending device and a receiving device (e.g., from the multiple integrated circuit controller 202 to an integrated circuit 204, or vice-versa), the two devices error check the data transaction to verify that the data was communicated, received, and not corrupted. If one or the other device detects a data communication error, the multiple integrated circuit controller 202 can re-initiate the data transaction.

Figure 4:
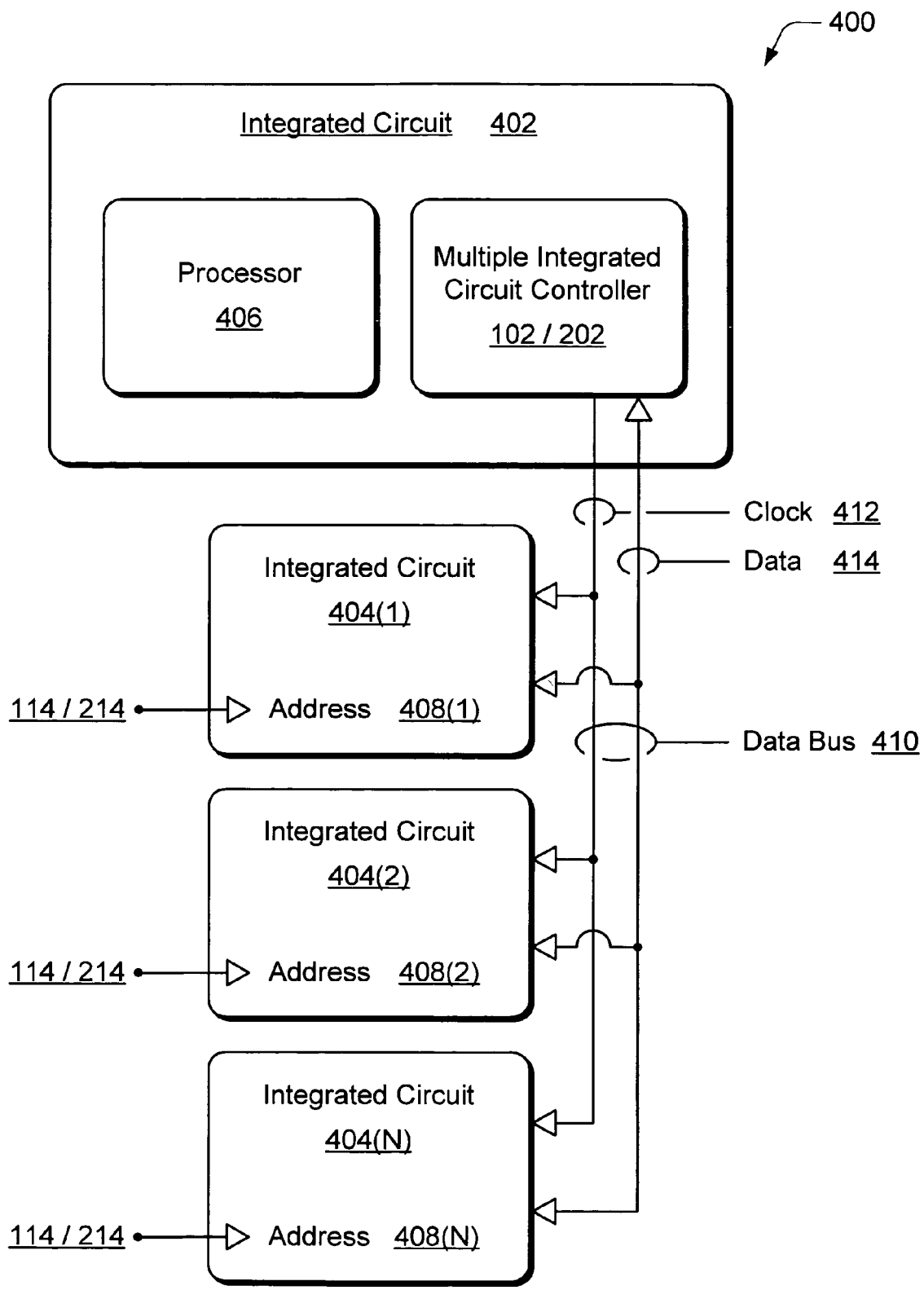
FIG. 4 illustrates an embodiment of a multiple integrated circuit control system.

FIG. 4 illustrates an embodiment of a multiple integrated circuit control system 400 that includes a first integrated circuit 402 and additional integrated circuits 404(1-N) in an implementation of multiple integrated circuit control. The integrated circuit 402 includes a multiple integrated circuit controller, such as controller 102 shown in FIG. 1 in a single-ended interface circuit 100, or controller 202 shown in FIG. 2 in a low voltage differential signaling interface circuit 200. Multiple integrated circuit controller 102/202 executes computer executable instructions initiated from processor 406. In an embodiment, the integrated circuit 402 can be implemented in an electronic and/or imaging device, such as an integrated circuit of the exemplary printing device 700 shown in FIG. 7, for operational control and data transactions within the device.

In an embodiment, the integrated circuit 402 may be implemented as an application-specific integrated circuit (ASIC) and includes the processor 406 which can be implemented as any of microprocessors, controllers, and the like which process various instructions (e.g., computer executable instructions) to control the operation of integrated circuit 402 and the associated components. Each of the integrated circuits 404(1-N) include an address 408(1-N), respectively, that can be received as a unique address 114/214.

A data bus 410 links the multiple integrated circuit controller 102/202 to each of the integrated circuits 404(1-N). In one implementation, the data bus 410 includes a clock signal link 412 and a data link 414, such as in the single-ended interface circuit 100 shown in FIG. 1. In another implementation, the data bus 410 includes a differential clock signal link 412 and a differential data link 414, such as in the low voltage differential signaling interface circuit 200 shown in FIG. 2.

The clock output of the multiple integrated circuit controller 102/202 is coupled to a clock input of the integrated circuits 404(1-N) via the clock signal link 412. The data input/output of the multiple integrated circuit controller 102/202 is coupled to a data input/output of the integrated circuits 404(1-N) via the data link 414.

In an embodiment of multiple integrated circuit control, the bus timing as detected by the multiple integrated circuit controller 102/202 is different than the timing detected by the integrated circuits 404(1-N). This improves bus reliability and the timing on the data bus 410. The multiple integrated circuit controller 102/202 generates the clock signal which appears more accurate to the controller than to the integrated circuits 404(1-N) that can only respond to detected clock signal edges. Additionally, the integrated circuits 404(1-N) detect a clock signal that is skewed in time relative to the clock signal that the multiple integrated circuit controller 102/202 generates.

The multiple integrated circuit controller 102/202 receives data returned from a receiving device the controller 102/202 has generated a clock edge and the edge has traveled the length of data bus 410, which may be cable or wire connection. The receiving device receives the edge of the clock signal and communicates a component of the data transaction (e.g., data 306) via the data bus 410 which reverse travels the length of data bus 410 back to the controller 102/202. This may cause the data arrival at the controller 102/202 to be skewed relative to the clock signal that it generated. An integrated circuit 404 detects the data and the clock signal after each is communicated together one length of data bus 410. Thus, the data signal and the clock signal may substantially coincide (e.g., are not skewed in time relative to each other). Accordingly, the controller 102/202 and the integrated circuits 404(1-N) implement a different timing to achieve the desired timing detected at the devices.

The multiple integrated circuit controller 102/202 drives the data approximately mid cycle of a clock signal high or low which enables a position of the data signal to be either advanced or delayed relative to the center of the clock signal. This allows for a desired setup and hold time for an integrated circuit 404 to achieve increased bus performance. The integrated circuit 404 then samples the data on the next clock edge.

An integrated circuit 404 drives the data on each clock edge and the controller 102/202 samples the data just before it drives the next clock edge. This allows an increased amount of time for the integrated circuit 404 to receive the clock signal and drive the new data to the controller 102/202 before the controller 102/202 samples the data and drives the next clock edge. The time duration that the controller 102/202 waits after sampling the data to drive the next clock signal can be determined by data hold times at the controller 102/202.

A method for multiple integrated circuit control may be described in the general context of computer executable instructions. Generally, computer executable instructions include routines, programs, objects, components, data structures, and the like that perform particular function(s) or implement data type(s). Furthermore, a method for multiple integrated circuit control can be implemented in any suitable hardware, software, firmware, or combination thereof.

Figure 5:
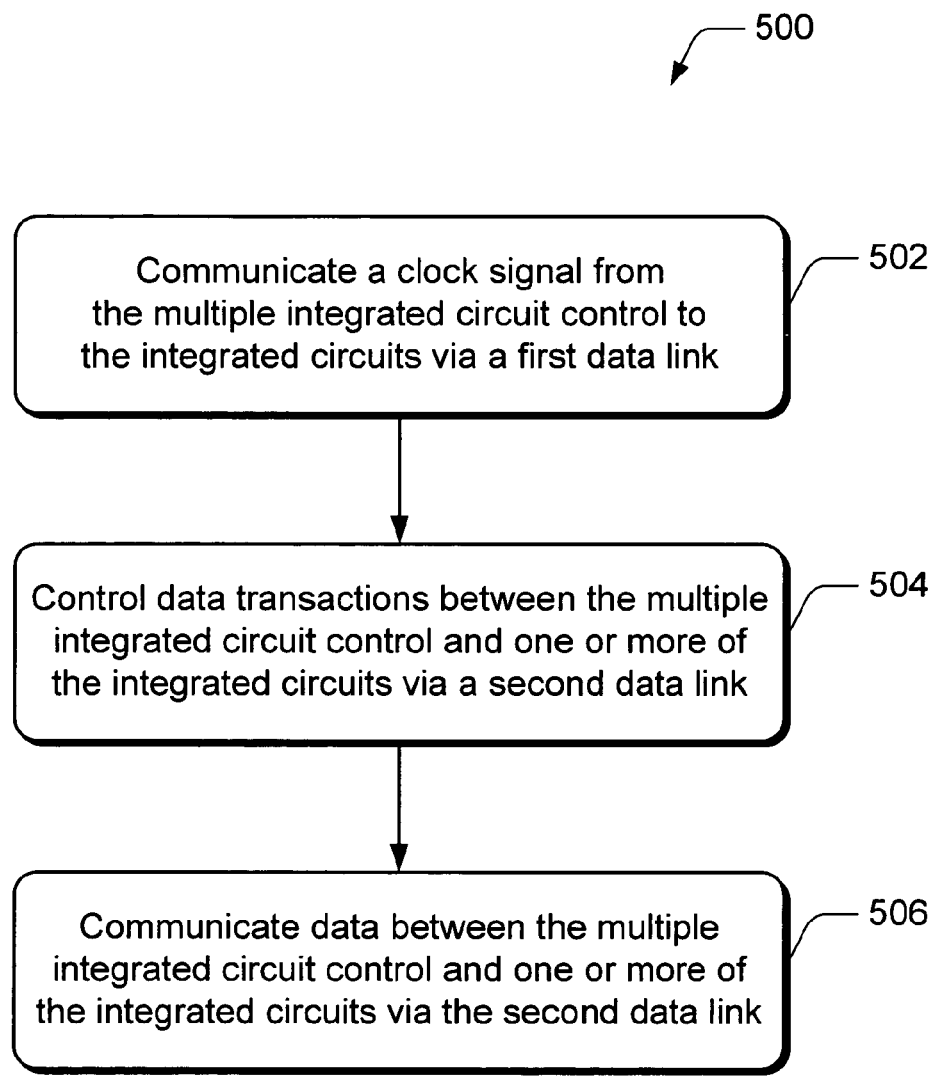
FIG. 5 is a flow diagram that illustrates an embodiment of a method for multiple integrated circuit control.

FIG. 5 illustrates a method 500 for an embodiment of multiple integrated circuit control that can be implemented to control data transactions between a multiple integrated circuit controller and one or more integrated circuits. The order in which the method is described is not intended to be construed as a limitation, and any number of the described method blocks can be combined in any order to implement the method.

At block 502, a clock signal is communicated from the multiple integrated circuit control to the integrated circuits via a first data link. For example, a clock signal (e.g., clock output 106 of multiple integrated circuit controller 102 in FIG. 1) can be communicated to the integrated circuits 104(1-N) as clock inputs 116(1-N), respectively, via the clock signal link 124. The clock signal 106 can be driven on the data link 126 with the push-pull driver 128 of the multiple integrated circuit control 102. Further, a clock signal (e.g., clock output 206 of multiple integrated circuit controller 202 in FIG. 2) can be communicated as a low voltage differential clock signal to the integrated circuits 204(1-N) as clock inputs 216(1-N), respectively, via the differential clock signal link 224. The clock signals can be communicated as a continuous clock signal 302 (FIG. 3) or as a pulsed clock signal 304 to the integrated circuits.

At block 504, data transactions are controlled between the multiple integrated circuit control and one or more of the integrated circuits via a second data link. For example, the multiple integrated circuit controller 202 is configured to control a write data transaction from the controller 202 to a first integrated circuit 204(1) via the differential data link 226, and is further configured to control a read data transaction from a second integrated circuit 204(2) to the controller, 202 also via the differential data link 226.

At block 506, data is communicated between the multiple integrated circuit control and one or more of the integrated circuits via the second data link. For example, data 306 (FIG. 3) can be communicated as write data from the multiple integrated circuit controller 102 to an integrated circuit 104 via the data link 126 and/or data 306 can be communicated as read data from an integrated circuit 104 to the multiple integrated circuit controller 102 also via the data link 126. Further, data 306 can be communicated as a low voltage differential data signal via the differential data link 226 between the multiple integrated circuit controller 202 and an integrated circuit 204.

Figure 6:
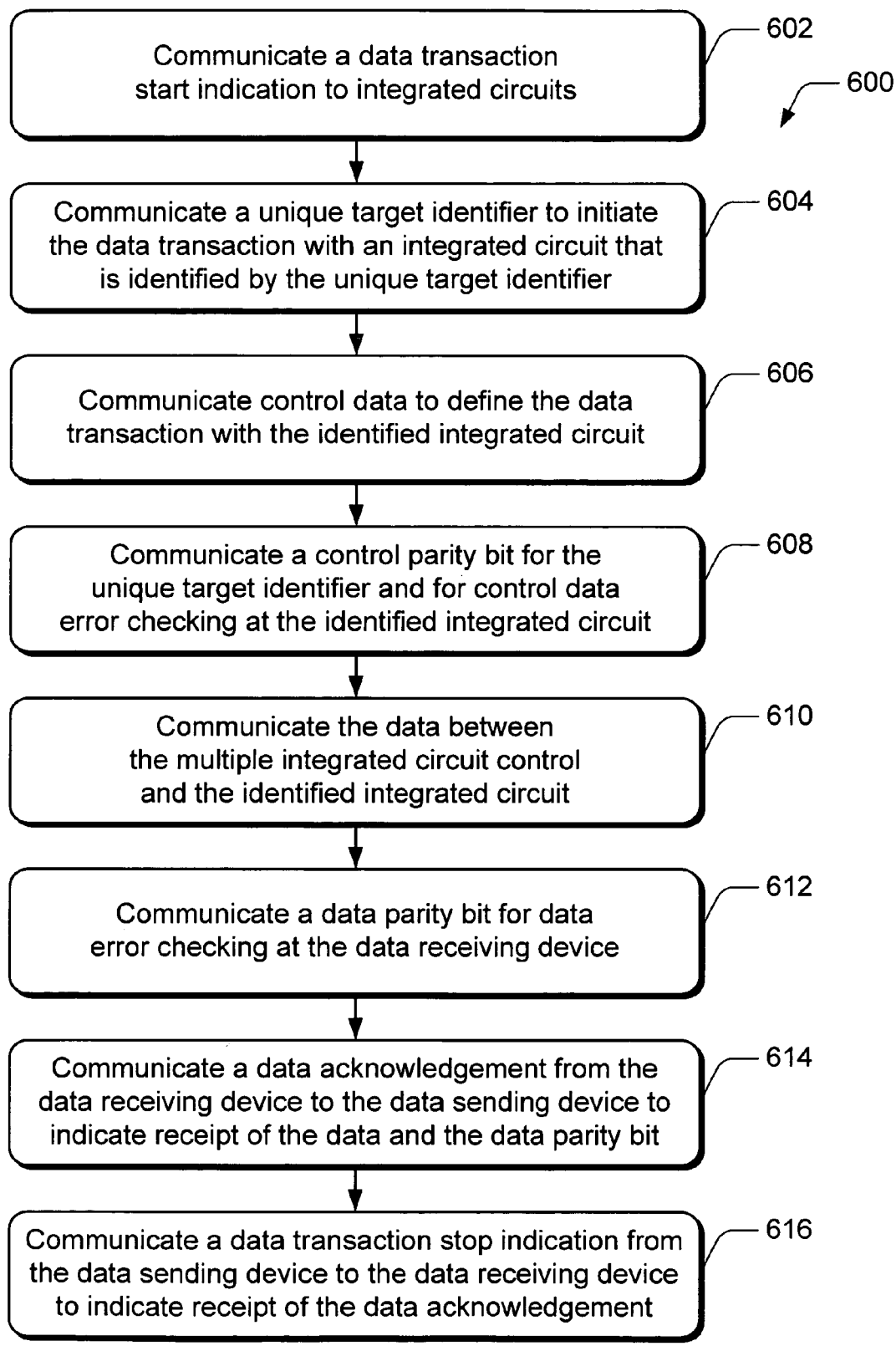
FIG. 6 is a flow diagram that illustrates an embodiment of a method for multiple integrated circuit control.

FIG. 6 illustrates a method 600 for an embodiment of multiple integrated circuit control that can be implemented to control a data transaction between a multiple integrated circuit controller and an integrated circuit. The order in which the method is described is not intended to be construed as a limitation, and any number of the described method blocks can be combined in any order to implement the method.

At block 602, a data transaction start indication is communicated from a multiple integrated circuit control to integrated circuits. For example, the multiple integrated circuit controller 202 communicates a data transaction start indication 314 to the integrated circuits 204(1-N). At block 604, a unique target identifier is communicated to initiate the data transaction with an integrated circuit that is identified by the unique target identifier. For example, the multiple integrated circuit controller 202 communicates a unique target identifier (TID) 316 to the integrated circuits 204(1-N), one of which is identified by the unique target identifier (TID) 316.

At block 606, control data is communicated to define the data transaction with the identified integrated circuit. For example, the multiple integrated circuit controller 202 communicates a control (CNTL) 318 to the identified integrated circuit 204 to define the data transaction, such as a read data transaction, a write data transaction, and the like. At block 608, a control parity bit is communicated for the unique target identifier and for control data error checking at the identified integrated circuit. For example, the multiple integrated circuit controller 202 communicates a control parity (CPTY) 320 to the identified integrated circuit 204.

At block 610, the data is communicated between the multiple integrated circuit control and the identified integrated circuit. For example, if the data 322 is communicated from the multiple integrated circuit controller 202 to the identified integrated circuit 204, then the controller 202 is a data sending device and the identified integrated circuit 204 is a data receiving device. If, however, the data 322 is communicated from the identified integrated circuit 204 to the controller 202, then the controller 202 is the data receiving device and the identified integrated circuit 204 is the data sending device.

At block 612, a data parity bit is communicated for data error checking at the data receiving device (e.g., the sending device communicates the data parity bit to the receiving device). For example, the sending device communicates a data parity (DPTY) 324 to the receiving device. At block 614, a data acknowledgement is communicated from the data receiving device to the data sending device to indicate receipt of the data and the data parity bit. For example, the receiving device communicates a data acknowledgement (DACK) 326 to the sending device. At block 616, a data transaction stop indication is communicated from the data sending device to the data receiving device to indicate receipt of the data acknowledgement. For example, the sending device communicates a stop indication 322 to the receiving device.

Figure 7:
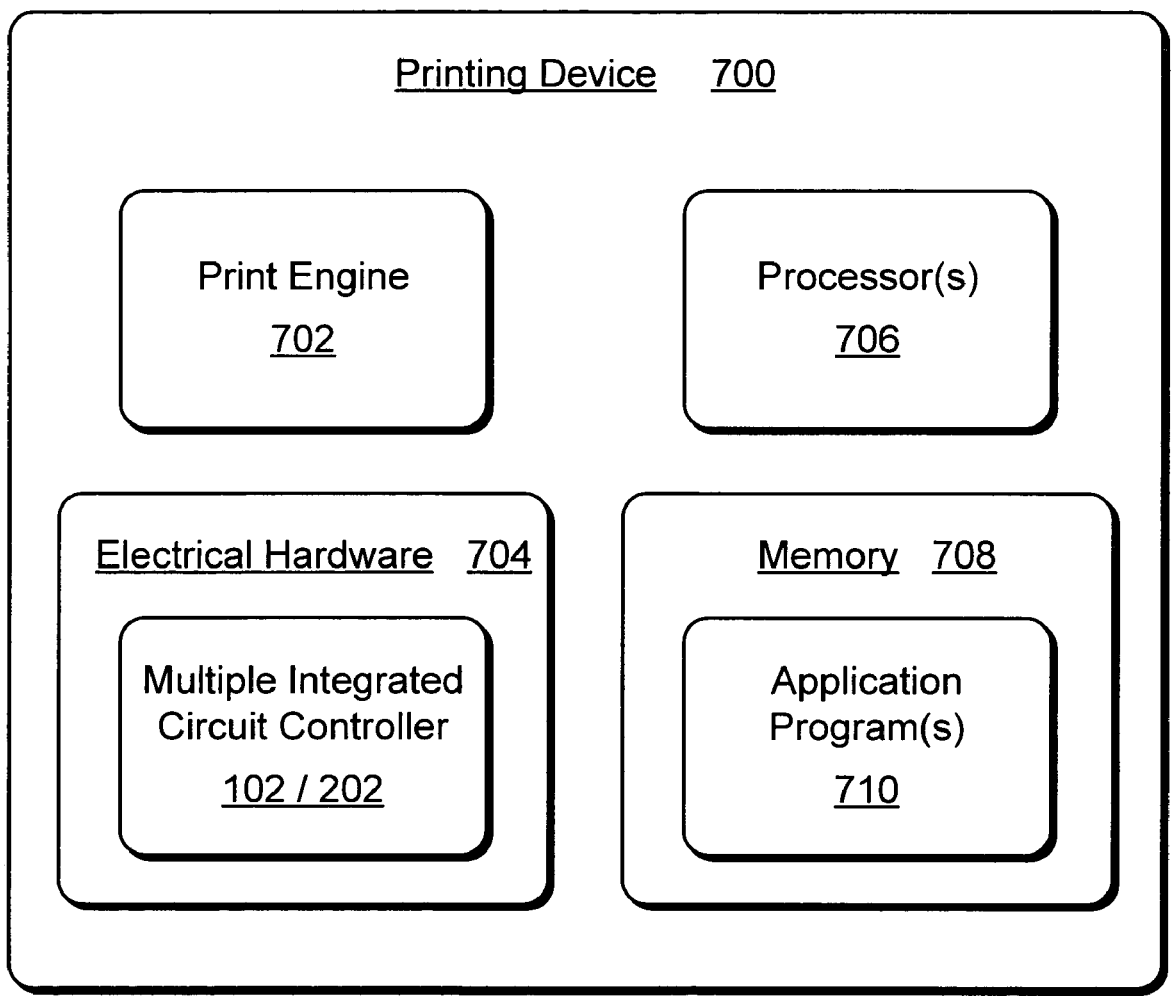
FIG. 7 illustrates various components of an embodiment of a printing device in which an embodiment of multiple integrated circuit control can be implemented.

FIG. 7 illustrates various components of an embodiment of a printing device 700 in which multiple integrated circuit control can be implemented. General reference is made herein to one or more printing devices, such as printing device 700. As used herein, "printing device" means any electronic device having data communications, data storage capabilities, and/or functions to render printed characters, text, graphics, and/or images on a print media. A printing device may be a printer, fax machine, copier, plotter, and the like. The term "printer" includes any type of printing device using a transferred imaging medium, such as ejected ink, to create an image on a print media. Examples of such a printer can include, but are not limited to, inkjet printers, electrophotographic printers, plotters, portable printing devices, as well as all-in-one, multi-function combination devices.

Printing device 700 includes a print engine 702 that includes mechanisms arranged to selectively apply an imaging medium such as liquid ink, toner, and the like to a print media in accordance with print data corresponding to a print job. The print media can include any form of media used for printing such as paper, plastic, fabric, Mylar, transparencies, and the like, and different sizes and types such as 8½×11, A4, roll feed media, etc. Printing device 700 also includes various electrical hardware 704 which may include a multiple integrated circuit controller 102/202, an integrated circuit 104/204, any of the various components of an embodiment of the single-ended interface circuit 100 shown in FIG. 1, and any of the various components of an embodiment of the low voltage differential signaling interface circuit 200 shown in FIG. 2.

Printing device 700 may include one or more processors 706 (e.g., any of microprocessors, controllers, and the like) which process various instructions (e.g., computer executable instructions) to control the operation of printing device 700 and to communicate with other electronic and computing devices. Further, printing device 700 can be implemented with one or more memory components 708, examples of which include random access memory (RAM), a disk drive, and non-volatile memory (e.g., any one or more of a ROM, flash memory, EPROM, EEPROM, etc.). The one or more memory components maintain information and data related to operational aspects of printing device 700, as well as application program(s) 710 which can be executed on processor(s) 706 to initiate and/or implement a method for an embodiment of multiple integrated circuit control.

Although embodiments of multiple integrated circuit control have been described in language specific to structural features and/or methods, it is to be understood that the subject of the appended claims is not necessarily limited to the specific features or methods described. Rather, the specific features and methods are disclosed as exemplary implementations of multiple integrated circuit control.

The invention claimed is:

1. A multiple integrated circuit control system, comprising:
   a multiple integrated circuit controller configured to initiate and control data transactions between the multiple integrated circuit controller and integrated circuits;
   a data link configured to communicate the data transactions between the multiple integrated circuit controller and one or more of the integrated circuits, the multiple integrated circuit controller including a first push-pull driver to drive the data transactions;
   a clock signal link configured to communicate a continuous clock signal generated by only the multiple integrated circuit controller to the integrated circuits during all of the data transactions between the multiple integrated circuit controller and all of the integrated circuits and communicate the continuous clock signal generated by only the multiple integrated circuit controller between all of the data transactions, the multiple integrated circuit controller including a second push-pull driver to drive the continuous clock signal.

2. A multiple integrated circuit control system as recited in claim 1, wherein the data link and the clock signal link form a two-wire control data bus.

3. A multiple integrated circuit control system as recited in claim 1, wherein the data link is further configured to communicate write data from the multiple integrated circuit controller to one or more of the integrated circuits.

4. A multiple integrated circuit control system as recited in claim 1, wherein the data link is further configured to communicate read data from one or more of the integrated circuit to the multiple integrated circuit controller.

5. A multiple integrated circuit control system as recited in claim 1, wherein the multiple integrated circuit controller is further configured to control a write data transaction from the multiple integrated circuit controller to a first integrated circuit via the data link, and control a read data transaction from a second integrated circuit to the multiple integrated circuit controller via the data link.

6. A multiple integrated circuit control system as recited in claim 1, wherein the data link is further configured to communicate error check data between the multiple integrated circuit controller and one or more of the integrated circuits.

7. A multiple integrated circuit control system as recited in claim 1, wherein:
- the multiple integrated circuit controller is further configured to communicate a unique target identifier via the data link to initiate a data transaction with an integrated circuit that has an address identified by the unique target identifier;
- in an event that the data transaction is a write data transaction, the data link is further configured to communicate the data from the multiple integrated circuit controller to the identified integrated circuit; and
- in an event that the data transaction is a read data transaction, the data link is further configured to communicate the data from the identified integrated circuit to the multiple integrated circuit controller.

8. A printing device comprising the multiple integrated circuit control system as recited in claim 1 wherein the multiple integrated circuit control executes computer executable instructions initiated from a processor of the printing device.

9. A multiple integrated circuit control, comprising:
- a clock signal output configured to communicate a pulsed clock signal generated by only the multiple integrated circuit control to integrated circuits via a first data link of a data bus during all data transactions between the multiple integrated circuit control and all of the integrated circuits and communicate an idle clock signal generated by only the multiple integrated circuit control between all of the data transactions;
- a first push-pull driver configured to drive the pulsed clock signal on the first data link;
- a data input/output configured to communicate data between the multiple integrated circuit control and one or more of the integrated circuits via a second data link of the data bus; and
- a second push-pull driver configured to drive the data on the second data link.

10. A multiple integrated circuit control as recited in claim 9 implemented as a single-ended interface control circuit.

11. A multiple integrated circuit control as recited in claim 9 implemented as a low voltage differential signaling interface control circuit.

12. A multiple integrated circuit control as recited in claim 9 implemented as a low voltage differential signaling interface control circuit, wherein:
- the first data link is a differential clock signal link configured to communicate the pulsed clock signal as a low voltage differential clock signal; and
- the second data link is a differential data link configured to communicate the data as a low voltage differential data signal.

13. A multiple integrated circuit control as recited in claim 9, wherein the data input/output is further configured to communicate write data from the multiple integrated circuit control to an integrated circuit via the second data link.

14. A multiple integrated circuit control as recited in claim 9, wherein the data input/output is further configured to communicate read data from an integrated circuit to the multiple integrated circuit control via the second data link.

15. A multiple integrated circuit control as recited in claim 9, wherein the data input/output is further configured to communicate write data from the multiple integrated circuit control to a first integrated circuit, and communicate read data from a second integrated circuit to the multiple integrated circuit control.

16. A multiple integrated circuit control as recited in claim 9, wherein the data input/output is further configured to communicate error check data between the multiple integrated circuit control and one or more of the integrated circuits via the second data link.

17. A multiple integrated circuit control as recited in claim 9, wherein:
- the data input/output is further configured to communicate a unique target identifier via the second data link to initiate a data transaction with an integrated circuit that has an address identified by the unique target identifier;
- in an event that the data transaction is a write data transaction, the data input/output is further configured to communicate the data from the multiple integrated circuit control to the identified integrated circuit; and
- in an event that the data transaction is a read data transaction, the data input/output is further configured to communicate the data from the identified integrated circuit to the multiple integrated circuit control.

18. A printing device comprising the multiple integrated circuit control as recited in claim 9 wherein the multiple integrated circuit control executes computer executable instructions initiated from a processor of the printing device.

19. An application-specific integrated circuit (ASIC) configured with the multiple integrated circuit control as recited in claim 9 wherein the multiple integrated circuit control of the ASIC includes logic to control the integrated circuits.

20. A method, comprising:
- communicating a continuous clock signal generated from only a multiple integrated circuit control to integrated circuits via a first data link during all data transactions between the multiple integrated circuit control and all of the integrated circuits, the continuous clock signal being driven with a first push-pull driver of the multiple integrated circuit control;
- communicating the continuous clock signal between all of the data transactions; and
- communicating data between the multiple integrated circuit control and one or more of the integrated circuits via a second data link, the data being driven with a second push-pull driver of the multiple integrated circuit control.

21. A method as recited in claim 20, wherein:
- communicating the continuous clock signal includes communicating the continuous clock signal as a low voltage differential clock signal; and
- communicating the data includes communicating the data as a low voltage differential data signal.

22. A method as recited in claim 20, wherein communicating the data includes communicating write data from the multiple integrated circuit control to an integrated circuit via the second data link.

23. A method as recited in claim 20, wherein communicating the data includes communicating read data from an integrated circuit to the multiple integrated circuit control via the second data link.

24. A method as recited in claim 20, further comprising:
controlling a write data transaction from the multiple integrated circuit control to a first integrated circuit via the second data link; and
controlling a read data transaction from a second integrated circuit to the multiple integrated circuit control via the second data link.

25. A method as recited in claim 20, further comprising communicating error check data between the multiple integrated circuit control and an integrated circuit via the second data bus link.

26. A method as recited in claim 20, further comprising communicating a unique target identifier via the second data link to initiate a data transaction with an integrated circuit that has an address identified by the unique target identifier.

27. A method as recited in claim 20, further comprising communicating a unique target identifier via the second data link to initiate a data transaction with an integrated circuit that has an address identified by the unique target identifier, wherein:
in an event that the data transaction is a write data transaction, communicating the data includes communicating the data from the multiple integrated circuit control to the identified integrated circuit; and
in an event that the data transaction is a read data transaction, communicating the data includes communicating the data from the identified integrated circuit to the multiple integrated circuit control.

28. A single-ended interface control circuit comprising a multiple integrated circuit control configured to perform the method as recited in claim 20.

29. A low voltage differential signaling interface control circuit comprising a multiple integrated circuit control configured to perform the method as recited in claim 20.

30. A method as recited in claim 20, wherein communicating the data via the second data link includes:
communicating a data transaction start indication from the multiple integrated circuit control to the integrated circuits;
communicating a unique target identifier to initiate the data transaction with an integrated circuit that is identified by the unique target identifier;
communicating control data from the multiple integrated circuit control to define the data transaction with the identified integrated circuit;
communicating a control parity bit from the multiple integrated circuit control to the integrated circuit having the unique target identifier for control data error checking at the identified integrated circuit;
communicating the data between the multiple integrated circuit control and the identified integrated circuit, wherein the multiple integrated circuit control is a data sending device and the identified integrated circuit is a data receiving device in an event that the data is communicated from the multiple integrated circuit control to the identified integrated circuit, further wherein the multiple integrated circuit control is the data receiving device and the identified integrated circuit is the data sending device in an event that the data is communicated from the identified integrated circuit to the multiple integrated circuit control;
communicating a data parity bit for data error checking at the data receiving device;
communicating a data acknowledgement from the data receiving device to the data sending device to indicate receipt of the data and the data parity bit; and
communicating a data transaction stop indication from the data sending device to the data receiving device to indicate receipt of the data acknowledgement.

31. Computer-readable media comprising computer executable instructions that, when executed, direct a multiple integrated circuit control to:
communicate a pulsed clock signal generated by only the multiple integrated circuit control to integrated circuits via a first data link of a data bus during all data transactions between the multiple integrated circuit control and all of the integrated circuits, the pulsed clock signal being driven by a first push-pull driver of the multiple integrated circuit control;
communicate an idle clock signal generated by only the multiple integrated circuit control between all of the data transactions;
communicate write data from the multiple integrated circuit control to an integrated circuit via a second data link of the data bus according to a write data transaction initiated by the multiple integrated circuit control, the write data being driven by a second push-pull driver of the multiple integrated circuit control; and
communicate read data from the integrated circuit to the multiple integrated circuit control via the second data link of the data bus according to a read data transaction initiated by the multiple integrated circuit control.

32. Computer-readable media as recited in claim 31, further comprising computer executable instructions that, when executed, direct the multiple integrated circuit control to coordinate the write data transaction and the read data transaction via the second data link of the data bus.

33. Computer-readable media as recited in claim 31, further comprising computer executable instructions that, when executed, direct the multiple integrated circuit control to communicate error check data between the multiple integrated circuit control and one or more of the integrated circuits via the second data link.

34. Computer-readable media as recited in claim 31, further comprising computer executable instructions that, when executed, direct the multiple integrated circuit control to communicate a unique target identifier via the second data link to initiate a data transaction with an integrated circuit that has an address identified by the unique target identifier.

35. A multiple integrated circuit control, comprising:
means to communicate a continuous clock signal driven only by a first push-pull driver to integrated circuits via a first data link of a data bus during all data transactions between the means to communicate and all of the integrated circuits;
means to initiate and communicate write data driven by a second push-pull driver to an integrated circuit via a second data link of the data bus;
means to initiate and receive read data from the integrated circuit via the second data link of the data bus;
means to generate the continuous clock signal during all of the data transactions between the means to communicate and all of the integrated circuits; and means to generate the continuous clock signal between all of the data transactions.

36. A multiple integrated circuit control as recited in claim 35, further comprising means to coordinate a write data transaction to communicate the write data to the integrated circuit and a read data transaction to receive the read data from the integrated circuit.

37. A multiple integrated circuit control as recited in claim 35, further comprising means to error check data communications between the multiple integrated circuit control and one or more of the integrated circuits.

38. A multiple integrated circuit control as recited in claim 35, further comprising means to communicate a unique target identifier via the second data link to initiate a data transaction with an integrated circuit that has an address identified by the unique target identifier.

* * * * *